United States Patent
Ketireddy et al.

(10) Patent No.: US 12,019,742 B1
(45) Date of Patent: Jun. 25, 2024

(54) AUTOMATED THREAT MODELING USING APPLICATION RELATIONSHIPS

(71) Applicant: Amazon Technologies, Inc., Seattle, WA (US)

(72) Inventors: Raghuveer Ketireddy, Redmond, WA (US); Trevor Tonn, Seattle, WA (US); Daniel Bailey, Austin, TX (US); Naga Venkata Sunil Alamuri, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 397 days.

(21) Appl. No.: 15/996,361

(22) Filed: Jun. 1, 2018

(51) Int. Cl.
| | | |
|---|---|---|
| *G06F 21/55* | (2013.01) | |
| *G06F 16/25* | (2019.01) | |
| *G06F 16/901* | (2019.01) | |
| *G06F 21/56* | (2013.01) | |
| *G06F 21/57* | (2013.01) | |

(52) U.S. Cl.
CPC .......... *G06F 21/554* (2013.01); *G06F 16/254* (2019.01); *G06F 16/9024* (2019.01); *G06F 21/562* (2013.01); *G06F 21/566* (2013.01); *G06F 21/577* (2013.01)

(58) Field of Classification Search
CPC ...... G06F 21/55; G06F 21/554; G06F 21/562; G06F 21/566; G06F 21/57; G06F 21/577; H04L 63/14; H04L 63/1416; H04L 63/1433
See application file for complete search history.

(56) References Cited

U.S. PATENT DOCUMENTS

| | | | | |
|---|---|---|---|---|
| 7,818,788 B2 | 10/2010 | Meier | | |
| 7,891,003 B2 | 2/2011 | Mir et al. | | |
| 8,272,061 B1* | 9/2012 | Lotem | ................ | H04L 63/1433 726/25 |
| 8,490,192 B2* | 7/2013 | Dai | ...................... | G06F 21/568 726/23 |
| 8,516,575 B2* | 8/2013 | Burnside | ............ | H04L 63/1425 726/22 |
| 8,732,838 B2 | 5/2014 | Medvedev et al. | | |

(Continued)

OTHER PUBLICATIONS

Darren Pauli, "Mozilla project spits out threat modelling tool for sysadmins," Apr. 2015, theRegister.co.uk. Source: https://www.theregister.co.uk/2015/04/01/mozilla_project_spits_out_sys_admin_threat_modelling_tool/, pp. 1-5.

(Continued)

*Primary Examiner* — Zachary A. Davis
(74) *Attorney, Agent, or Firm* — Robert C. Kowert; Kowert, Hood, Munyon, Rankin & Goetzel, P.C.

(57) ABSTRACT

Methods, systems, and computer-readable media for automated threat modeling using application relationships are disclosed. A graph is determined that includes nodes and edges. At least a portion of the nodes represent software components, and at least a portion of the edges represent relationships between software components. An event is received, and a sub-graph associated with the event is determined. The event is indicative of a change to one or more of the nodes or edges in the graph. Threat modeling is performed on the sub-graph using one or more analyzers. The one or more analyzers determine whether the sub-graph is in compliance with one or more policies.

20 Claims, 8 Drawing Sheets

(56) References Cited

U.S. PATENT DOCUMENTS

| | | | |
|---|---|---|---|
| 8,856,725 | B1 | 10/2014 | Anderson et al. |
| 8,904,353 | B1 | 12/2014 | Arguelles et al. |
| 9,171,167 | B2* | 10/2015 | Ayyagari ............... G06F 21/577 |
| 9,195,833 | B2 | 11/2015 | Chestna |
| 9,210,185 | B1* | 12/2015 | Pinney Wood ....... G06F 21/577 |
| 9,575,979 | B1 | 2/2017 | McClintock et al. |
| 9,665,721 | B2 | 5/2017 | Artes et al. |
| 9,712,551 | B2 | 7/2017 | Grubel et al. |
| 9,736,182 | B1* | 8/2017 | Madhukar ............. H04L 63/102 |
| 9,954,879 | B1* | 4/2018 | Sadaghiani ........... G06F 16/285 |
| 10,084,804 | B2* | 9/2018 | Kapadia .............. H04L 63/1425 |
| 10,466,990 | B1 | 11/2019 | McCluskey et al. |
| 10,540,502 | B1 | 1/2020 | Joyce et al. |
| 10,680,895 | B1 | 6/2020 | McCluskey et al. |
| 10,860,295 | B1* | 12/2020 | Ketireddy ................ G06F 8/34 |
| 11,531,762 | B2 | 12/2022 | Gupta |
| 11,770,398 | B1 | 9/2023 | Erlingsson |
| 11,818,156 | B1 | 11/2023 | Parikh |
| 2003/0233631 | A1 | 12/2003 | Curry et al. |
| 2006/0111880 | A1 | 5/2006 | Brown |
| 2006/0168557 | A1 | 7/2006 | Agrawal et al. |
| 2006/0173893 | A1 | 8/2006 | Kristoffersen et al. |
| 2006/0173894 | A1 | 8/2006 | Kristoffersen et al. |
| 2007/0067844 | A1* | 3/2007 | Williamson .......... G06F 21/568 |
| | | | 713/188 |
| 2007/0162890 | A1 | 7/2007 | Meier et al. |
| 2007/0209074 | A1 | 9/2007 | Coffman |
| 2007/0240138 | A1 | 10/2007 | Chess et al. |
| 2007/0265814 | A1 | 11/2007 | Moore et al. |
| 2007/0294766 | A1 | 12/2007 | Mir et al. |
| 2008/0097630 | A1 | 4/2008 | Weatherhead |
| 2008/0256390 | A1 | 10/2008 | Chaar et al. |
| 2009/0077666 | A1 | 3/2009 | Chen et al. |
| 2009/0183061 | A1 | 7/2009 | Beneditto |
| 2009/0328223 | A1 | 12/2009 | Medvedev et al. |
| 2011/0093955 | A1 | 4/2011 | Chen et al. |
| 2011/0107303 | A1 | 5/2011 | Huang et al. |
| 2011/0246961 | A1 | 10/2011 | Tripathi |
| 2012/0317541 | A1 | 12/2012 | Kaulgud et al. |
| 2014/0090070 | A1 | 3/2014 | Tripp |
| 2014/0101769 | A1 | 4/2014 | Tripp |
| 2014/0237443 | A1 | 8/2014 | Pana et al. |
| 2015/0143524 | A1 | 5/2015 | Chestna |
| 2015/0244734 | A1* | 8/2015 | Olson ................... G06F 21/577 |
| | | | 726/25 |
| 2015/0309813 | A1 | 10/2015 | Patel |
| 2016/0196136 | A1 | 7/2016 | Thippavajjula |
| 2016/0239272 | A1 | 8/2016 | Petri |
| 2016/0248796 | A1 | 8/2016 | Choi et al. |
| 2016/0248798 | A1 | 8/2016 | Cabrera et al. |
| 2016/0275292 | A1 | 9/2016 | Chestna |
| 2017/0063891 | A1* | 3/2017 | Muddu ................. H04L 43/045 |
| 2017/0337293 | A1 | 11/2017 | Farkash |
| 2018/0060468 | A1 | 3/2018 | Morgan |
| 2018/0219888 | A1 | 8/2018 | Apostolopoulos |
| 2018/0262516 | A1* | 9/2018 | Zomlot .................. H04L 63/14 |
| 2018/0337939 | A1 | 11/2018 | Agarwal |
| 2019/0050319 | A1 | 2/2019 | Gondalia |
| 2019/0065606 | A1 | 2/2019 | Jiang |
| 2019/0138731 | A1 | 5/2019 | Tan et al. |
| 2019/0278760 | A1 | 9/2019 | Smart |
| 2019/0347422 | A1 | 11/2019 | Abadi |
| 2022/0247769 | A1 | 8/2022 | Erlingsson |
| 2023/0370334 | A1 | 11/2023 | Mannengal |
| 2023/0370452 | A1 | 11/2023 | Mannengal |

OTHER PUBLICATIONS

Kong, et al., "UML-Based Modeling and Analysis of Security Threats," International Journal of Software Engineering and Knowledge Engineering, vol. 20, No. 6, pp. 875-897, 2010.

* cited by examiner

AUTOMATED THREAT MODELING USING APPLICATION RELATIONSHIPS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. Examples of such systems include online merchants, internet service providers, corporate networks, cloud computing services, web-based hosting services, and so on. Complex systems may include many applications and services that interact with one another in varied ways. For example, a web server may receive requests for web pages and use a complex set of interrelated services to build those requested pages.

Figure 1A:
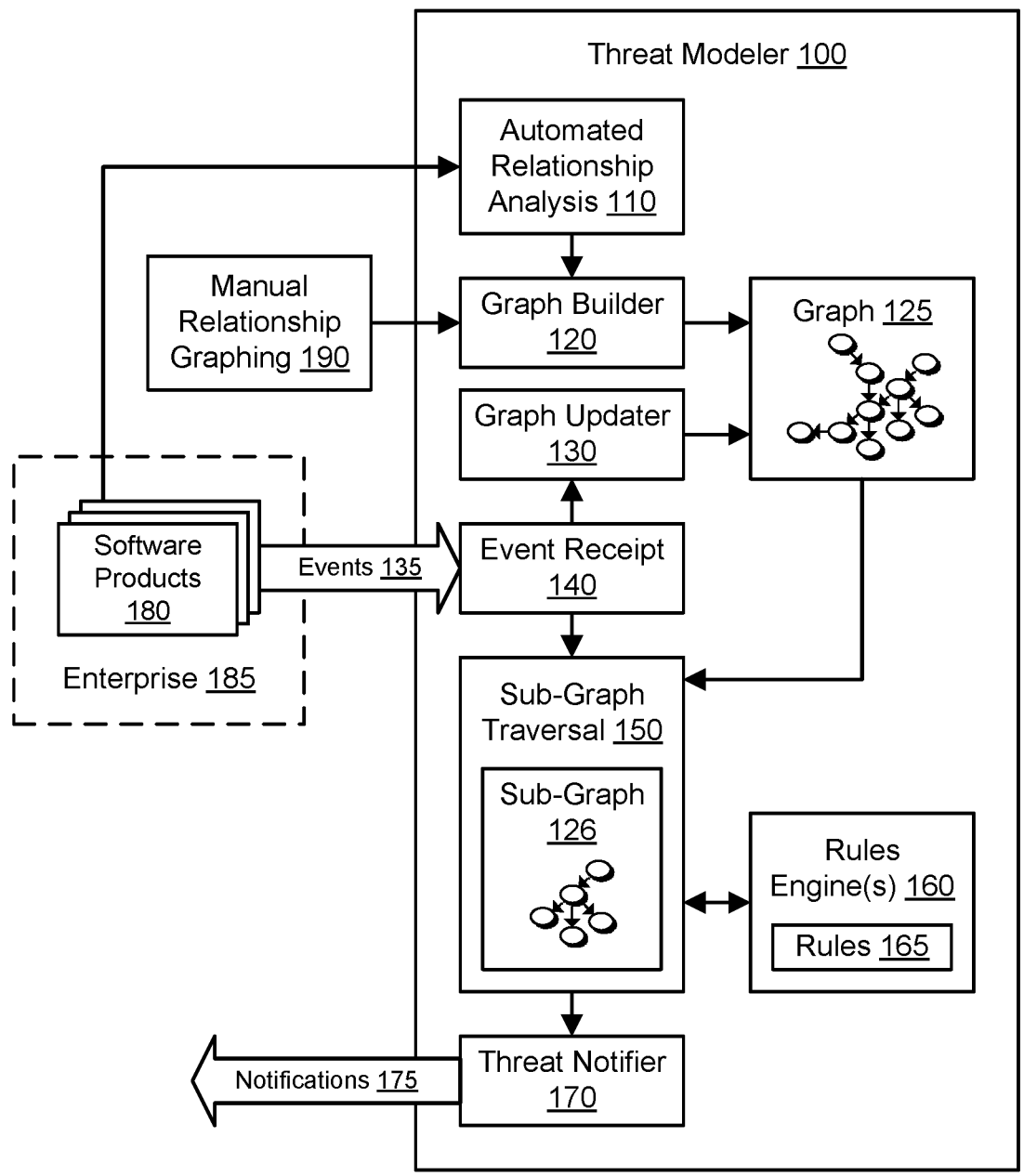
FIG. 1A and FIG. 1B illustrate an example system environment for automated threat modeling using application relationships, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for automated threat modeling using application relationships are described. In one embodiment, automated techniques may be used to perform threat modeling for software products. Software products may include executable program code such as applications, services, components of applications, components of services, and so on. The terms "application" and "service" may be used interchangeably herein. Automated threat modeling may attempt to determine whether security threats, vulnerabilities, or other security-related flaws are present in a software product. A graph of software components may be used to perform automated threat modeling, where the graph represents components as nodes and relationships between components as edges. The graph may capture a complex web of intra-application and inter-application relationships in an enterprise, such that different portions of the graph (sub-graphs) may represent different applications. In one embodiment, the graph may be built using automated techniques such as static code analysis, dynamic (runtime) analysis, and/or metadata acquisition. In one embodiment, the graph may be built based on user input and then modified using automated techniques to reduce human error in the user input. Using the graph, automated threat modeling may be performed repeatedly and at different stages of a software product's lifecycle. In one embodiment, automated threat modeling may be triggered by events in the enterprise. For example, a change to the program code or configuration of an application may generate an event, a threat modeler may receive the event (e.g., via a subscription), and the threat modeler may traverse a sub-graph relevant to the event (e.g., a portion of the graph rooted at one or more components associated with the changed application) in order to analyze threats for that sub-graph. The automated threat modeling may use an analyzer such as a rules engine to determine whether the nodes and/or edges of a sub-graph comply with applicable policies. For example, a particular rule may detect a threat if sensitive data is acquired by a node and then stored in an insecure manner. Automated threat modeling may also be initiated when a new rule or policy is added to the analyzer(s). If threats or policy noncompliance are found, the threat modeler may send notifications to owners or managers of the affected software products.

Using prior approaches for threat modeling, an application was often subjected to manual security review by experts or other humans, typically early in the application's lifecycle. For example, a user-drafted architecture document may have been manually reviewed by a security expert to determine security vulnerabilities. However, such manual techniques are prone to error. For example, the actual implementation may diverge from the design documents on which the manual review is based, or the documents themselves may be incomplete or incorrect. Additionally, such manual techniques demand users' time and accordingly may not be performed sufficiently often. For example, if a deployed application's code is changed or the application is reconfigured at a later stage of its lifecycle, a security expert may not subject the application to further manual review. The automated threat modeling described herein may address and mitigate such flaws.

As one skilled in the art will appreciate in light of this disclosure, embodiments may be capable of achieving certain technical advantages, including some or all of the following: (1) improving the accuracy of threat estimates for software products by reducing or eliminating human error and using inter-application relationships and intra-application relationships that are automatically determined; (2) improving the security and/or policy compliance of a software product by using automated threat modeling that reduces or eliminates human error; (3) reducing demands on user time by performing threat modeling using automated processes; (4) reducing the latency of addressing new threats by performing automated threat modeling repeatedly throughout a product lifecycle; (5) reducing the use of computational and memory resources by restricting a threat modeling analysis to a subset of a graph; (6) improving the security of an entire enterprise by using automated threat modeling to review large portions of the enterprise for newly discovered threats and/or newly added policies; and so on.

Figure 1B:
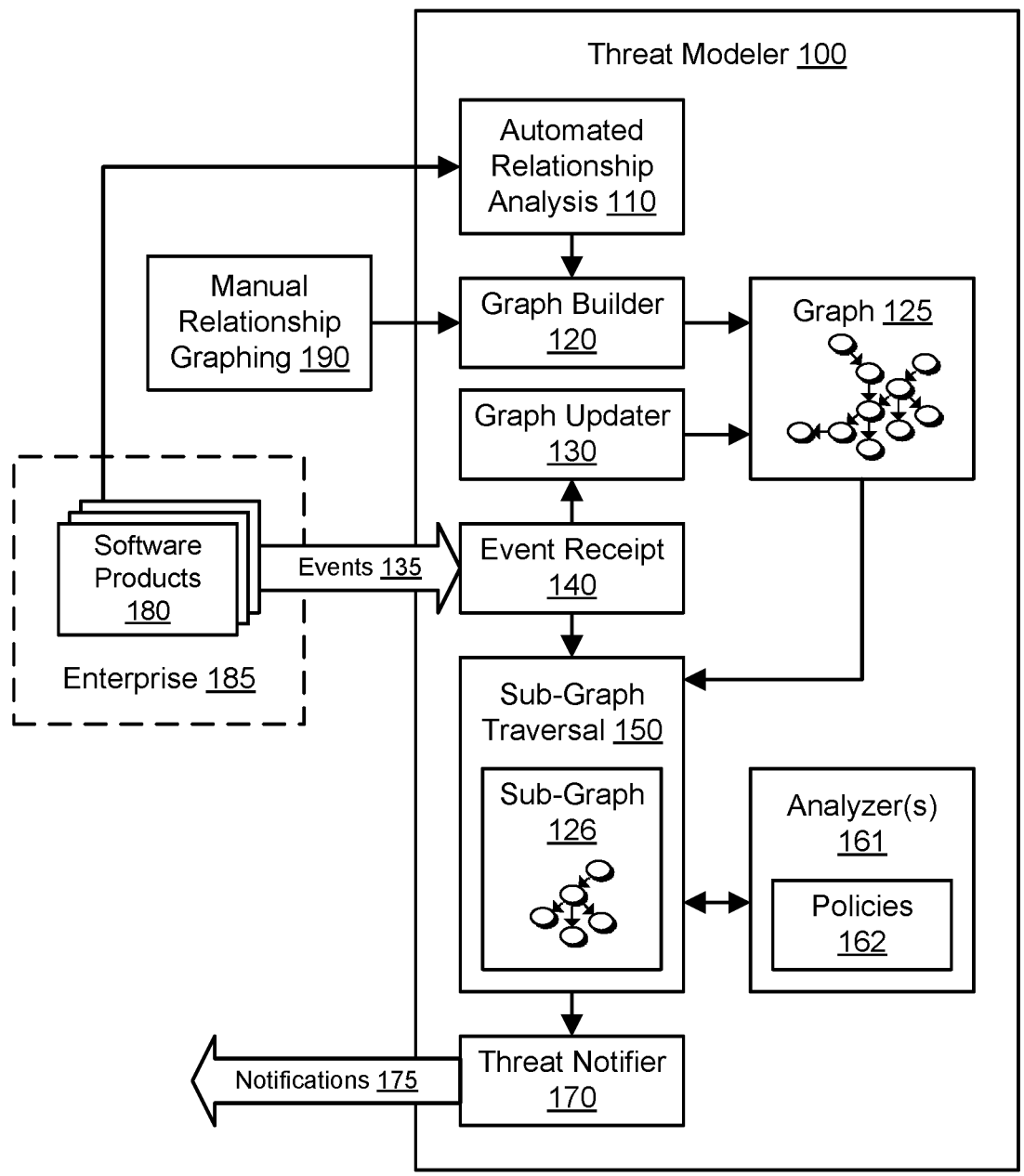

FIG. 1A and FIG. 1B illustrate an example system environment for automated threat modeling using application relationships, according to some embodiments. A threat modeler 100 may automate techniques to perform threat modeling for software products 180. Software products 180 may include executable program code such as applications, services, components of applications, components of services, and so on. The terms "application" and "service" may be used interchangeably herein. Components of software products 180 may include executable programs (e.g., applications, services, packages, and so on), configurations of programs, storage resources (e.g., as managed by network-accessible storage services), configurations of storage resources, database tables, execution environments, hosts or other computing devices, network devices (e.g., routers and load balancers), network entities (e.g., virtual private clouds), abstractions such as host classes, containers, tasks submitted to program execution services, other network-accessible services, and so on. In one embodiment, automated threat modeling may attempt to determine whether software products 180 comply with applicable policies. The policies may be security-related, and automated threat modeling by the threat modeler 100 may thus attempt to determine whether security threats, vulnerabilities, or other security-related flaws are present in software products 180. The policies may also relate to best practices for software development, for identifying availability concerns, for identifying privacy concerns, and so on. In various embodiments, the threat modeler may include various components such as a component for automated relationship analysis 110, a graph builder 120, a graph updater 130, a component for event receipt 140, a component for sub-graph traversal 150, one or more rules engines 160, and/or a threat notifier 170. These components and their operations are discussed as follows.

Using the graph builder 120, a graph 125 may be generated. The graph 125 may include a plurality of nodes representing software components and a plurality of edges representing relationships between software components. The edges may include directed edges. In one embodiment, the graph 125 may be a directed acyclic graph. The relationships may include relationships between components of a single application and/or relationships from one application to another application. For example, two connected nodes may represent an application and a storage object in a storage service, and the edge between the nodes may represent that the application stores data in that storage object. The graph may capture a complex web of intra-application and inter-application relationships in an enterprise 185, such that different portions of the graph (subgraphs) may represent different applications or services. For a sufficiently large enterprise 185, an enterprise-wide graph 125 may include vast numbers of nodes. In one embodiment, some portions of the graph 125 may be unconnected to (and unreachable by) other portions of the graph. The graph 125 may represent a machine-consumable model of software products 180, their components, and the relationships between products and components.

In one embodiment, the graph may be built using automated relationship analysis 110, e.g., using properties of the software products 180 themselves as input. For example, the automated relationship analysis 110 may include static code analysis, dynamic (runtime) analysis, and/or metadata acquisition. Static code analysis may include analysis of program code of applications and their components, e.g., to determine intra-application and inter-application relationships reflected in the program code. Runtime analysis may include call tracing among instances of applications and their components, e.g., to determine intra-application and inter-application relationships reflected in real-world service calls. In one embodiment, the graph may be built by using one or more ETL (Extract, Transform, Load) tools to extract relevant metadata from services or subsystems associated with the software products 180 and then using that extracted metadata to generate particular elements of the graph. For example, a software deployment system may link code packages to computing devices where the packages are intended to run; metadata capturing such relationships may be acquired and used to generate an edge between a code package and a device in the graph 125. The ETL tools may vary across different services or subsystems of the enterprise 185, such as different package management systems, database services, network-accessible or "cloud-based" storage services, application environments, containerization systems, and so on.

In one embodiment, the graph may be built initially based on user input, e.g., as captured using one or more tools for manual relationship graphing 190. For example, the graphing tool(s) 190 may permit developers to manually draw relationships between components of a software product in a graphical user interface. However, such user input may be incorrect or inaccurate or may become outdated at some point during the lifecycle of the software product. In one embodiment, to reduce or even eliminate such human error, the user-supplied initial graph may be modified, corrected, and/or augmented using the automated relationship analysis 110. In one embodiment, the user tool(s) 190 for describing application architectures and the tool for automated relationship analysis 110 may use a similar or identical set of terms for application types, relationship types, datatypes, and so on, in order to facilitate the use of the user-supplied information for automated graph building. In one embodiment, all or part of the graph 125 may be vended back to the graphing tool(s) 190 for visualization to users and/or to solicit further user input regarding the graph.

In one embodiment, the graph 125 may include metadata for individual nodes and edges, and the metadata may indicate unique node identifiers, unique edge identifiers, node types, edge types, and so on. Using such metadata, each node and/or edge may be uniquely identified in the graph 125. In one embodiment, additional metadata may be stored outside of the graph 125, e.g., in a storage service at a location or key associated with a node or edge in the graph itself. For example, contact information for an owner of a node may be stored external to the graph 125, e.g., in a database or storage service, and such information may be retrievable using a key or other identifier stored within the graph.

Using the event receipt component 140, events 135 may be received over time. Receipt of an event may trigger the updating of the graph 125. Receipt of an event may trigger automated threat analysis for a portion of the graph 125. An event may be indicative of a change to one or more of the nodes or edges in the graph. For example, the event may describe a change to the program code of a software component. As another example, the event may describe a change to the configuration of a software component. As yet another example, the event may describe a change to a relationship between two software components. Events may be generated by elements of the enterprise 185, such as software development environments in which program code is managed or ETL tools associated with various subsystems or services of the enterprise. An event may include data such as identifiers of one or more affected software components or relationships that correspond to nodes or edges in the graph. The threat modeler 100 may subscribe to events for changed software products and new rules, e.g., via an event streaming service. Events may be received repeatedly and at different times after the graph 125 is built. Events may be received throughout the lifecycle of a particular software product, e.g., when the software is designed, implemented, tested, deployed, updated with minor updates, updated with major updates, and so on. By triggering the automated threat analysis on such events, a particular software product may undergo a security review again and again as the product or its relationships change.

Using the graph updater 130, the graph 125 may be modified based (at least in part) on an event. The affected nodes or edges may be identified by comparing the graph metadata (e.g., the unique identifiers of nodes and edges) to the information in the event. In modifying the graph 125, the graph updater 130 may add one or more nodes, add one or more edges, remove one or more nodes, remove one or more edges, modify the metadata for one or more nodes, modify the metadata for one or more edges, and/or update the graph in any other suitable manner. For example, if the event indicates that the program code has been updated to store data having a particular datatype in a particular location in a storage service, the threat modeler may add a node for that storage service (with metadata indicating the particular location) and a directed edge connecting the software product to the storage service. As another example, the graph metadata for the updated portion of the graph may be modified to indicate the datatypes of source data and/or destination data for a new relationship. In one embodiment, the graph 125 may be updated by using one or more ETL (Extract, Transform, Load) tools to extract relevant data from a service or subsystem associated with the affected node(s) and then using that extracted data to modify particular elements of the graph.

As discussed above, the graph may capture a complex web of intra-application and inter-application relationships in an enterprise, such that different portions of the graph (sub-graphs) may represent different applications or services. Using the component for sub-graph traversal 150, a sub-graph 126 associated with an event may be identified in the graph 125. In one embodiment, the sub-graph 126 may include a plurality of nodes rooted at one or more nodes associated with a software product affected by the event. For example, if a component of an application is updated with new program code, then a sub-graph of other components that are dependent on the updated component may be identified. As another example, if an access policy on a storage object is changed, then the sub-graph may include nodes associated with that storage object.

Using the component for sub-graph traversal 150, threat modeling may be performed on the sub-graph 126. In one embodiment, as shown in FIG. 1A, the threat modeling may be performed using one or more rules engines 160. A rules engine may apply one or more rules 165 to metadata associated with nodes and edges of the sub-graph 126 to determine whether security threats or vulnerabilities are present in those nodes or edges. In one embodiment, as shown in FIG. 1B, the threat modeling may be performed using one or more analyzers 161. Using metadata associated with nodes and edges of the sub-graph 126, an analyzer may determine whether the sub-graph is in compliance with one or more policies 162. In one embodiment, the analyzer(s) 161 may include one or more rules engines. To perform this threat modeling, the sub-graph may be traversed from one or more root nodes in a process termed micro-traversal. The extent of the micro-traversal (e.g., the point at which the traversal ends) may be determined by the requirements of particular rules or policies. The entire graph 125 for an enterprise 185 may be large and complex, and the use of micro-traversal of a sub-graph 126 may permit the threat modeling to be performed efficiently and in a focused manner. In one embodiment, the sub-graph traversal 150 may implement generational graph traversal in which interested consumers (e.g., rules engines or analyzers) minimize graph operations (e.g., obtaining edges for a vertex or obtaining paths from one vertex to another vertex) by piggybacking on a single graph operation and exposing the results to a set of consumers.

The rules 165 for the rules engine(s) 160 may be written by developers to detect particular security threats. The policies 162 may be developed by users to determine whether software products are in compliance with best practices, e.g., to protect against security threats and vulnerabilities. In one embodiment, a main rules engine or analyzer may be used for common threats, and additional rules engines or analyzers may be added to detect new threats, uncommon threats, and/or threats requiring more complex analysis. In applying a rule to a sub-graph, metadata about nodes and edges may be extracted from the graph and used to determine whether the rule matches any portion of the sub-graph. The metadata may describe properties such as authentication properties, authorization properties, access control properties, datatype properties, and so on. Micro-traversals to apply rules or policies to sub-graphs may automate data-gathering and decision-making operations such as determining what a component does, determining what kind of data the component has, determining where the data is sent or stored, determining what protections are on the handling of the data, determining who has access to the hosts where code or data is located, and so on.

For a given sub-graph and a given rule, the sub-graph traversal 150 may determine whether or not a security threat or vulnerability is present in a software product or software component. A particular rule may dictate whether a threat or vulnerability is present based (at least in part) on the elements of the rule as applied to the metadata associated with nodes and edges of the sub-graph. For example, if a node in the sub-graph acquires sensitive data such as user payment information and then stores that information in an insecure manner (e.g., as plaintext in a storage service bucket), then an applicable rule may determine that the node represents a security threat. Similarly, the sub-graph traversal 150 may dictate whether component(s) of the sub-graph 126 are in compliance with a particular policy, e.g., based (at least in part) on the elements of the policy as applied to the metadata associated with nodes and edges of the sub-graph.

A threat notifier 170 may generate and send notifications 175 of security threats that are identified using the automated threat modeling. Using the threat notifier 170, if a threat is found, then an owner or manager associated with the affected node may be notified about the threat. Contact information for the owner or manager (e.g., an e-mail address or messaging address) may be extracted from the node itself or from metadata associated with the node and stored outside the graph, and a notification may be generated and sent to that contact address. In one embodiment, a notification may be provided to a subsystem that implements the affected node(s) or a management console associated with the affected node(s). In some embodiments, the content of a notification may vary based (at least in part) on the rule that was violated. A notification may indicate data such as a name or identifier of the insecure node or relationship, a name or description of the rule that was violated, a datatype that was handled insecurely, a description of the event that triggered the automated threat modeling, a timestamp of the event, a timestamp of the threat modeling, a classification of the risk level (e.g., high, medium, or low), and/or other suitable data usable by the owner or manager to mitigate the security threat. Mitigation of a security threat may include modifying the program code of a software product, modifying the configuration of a software product, modifying a relationship between two components, and so on.

In one embodiment, the threat notifier 170 may send notifications 175 to one or more automated processes. The automated processes may in turn send metadata to additional automated processes, and so on, for additional analysis. Ultimately a user may be notified as discussed above. In this manner, a pipeline of processes may collaborate to create a holistic view of problems in the enterprise 185 and provide more details to users.

Figure 2:
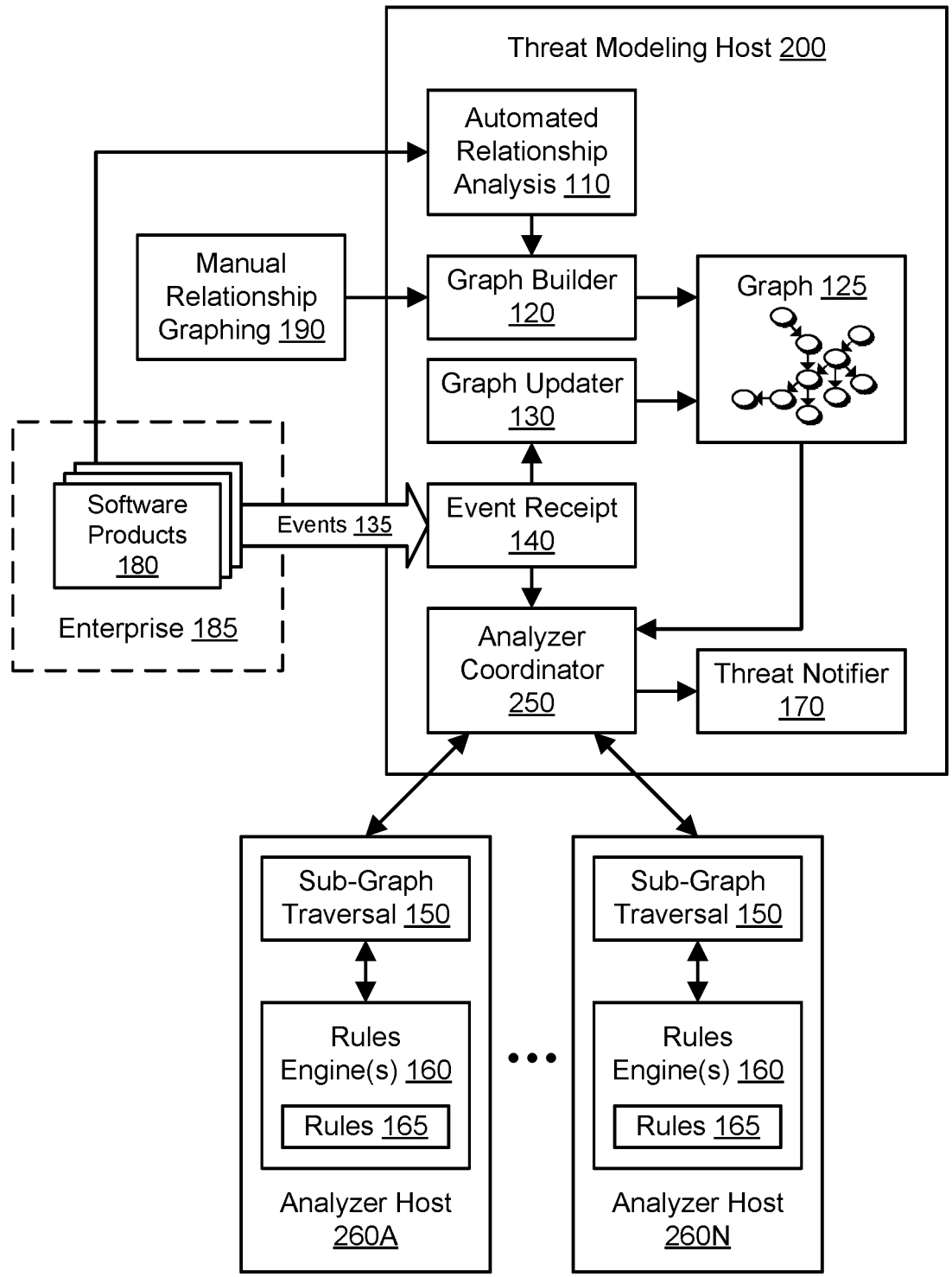
FIG. 2 illustrates further aspects of the example system environment for automated threat modeling using application relationships, including the use of a fleet of hosts to perform sub-graph traversal using one or more rules engines, according to one embodiment.

FIG. 2 illustrates further aspects of the example system environment for automated threat modeling using application relationships, including the use of a fleet of hosts to perform sub-graph traversal using one or more rules engines, according to one embodiment. In one embodiment, one or more threat modeling hosts such as host 200 may implement aspects of the threat modeler 100. For example, threat modeling host 200 may implement the automated relationship analysis 110, graph builder 120, graph updater 130, event receipt 140, and threat notifier 170. In one embodiment, a fleet of analyzer hosts 260A-260N may implement sub-graph traversal 150 using the rules engine(s) 160 or analyzer(s) 161. Although analyzer hosts through 260N are shown for purposes of illustration and example, it is contemplated that any suitable number and configuration of analyzer hosts may be used. In one embodiment, the various analyzer hosts 260A-260N may employ the same one or more rules engines 160 and the same rules 165 across the fleet of hosts. In one embodiment, the various analyzer hosts 260A-260N may employ different rules engines or rules across the fleet of hosts. In some embodiments, the analyzer hosts 260A-260N may employ analyzers 161 other than rules engines, e.g., to determine policy compliance of software products.

The threat modeling host 200 may include an analyzer coordinator 250 that coordinates the analyzer hosts 260A-260N. In one embodiment, the analyzer coordinator 250 may send commands to individual analyzer hosts in order to cause the individual hosts to perform sub-graph traversal for particular sub-graphs. In one embodiment, the analyzer coordinator 250 may then receive results of the sub-graph traversal from the individual analyzer hosts. The result of sub-graph traversal for a particular sub-graph and rule may indicate data such as whether a rule was matched in the sub-graph, the name and/or description of any rule that was matched, the component(s) affected by the matched rule, and any other information usable to mitigate threats that are identified. The result of sub-graph traversal for a particular sub-graph and policy may indicate data such as whether a policy was violated in the sub-graph, the name and/or description of any policy that was violated, the component(s) affected by the violated policy, and any other information usable to mitigate threats that are identified.

In one embodiment, the analyzer coordinator 250 may select or modify the number of analyzer hosts 260A-260N to meet the current processing needs of the threat modeling process. For example, the analyzer coordinator 250 may scale up the number of analyzer hosts as more events are received or scale down the number of analyzer hosts as fewer events are received. As another example, the analyzer coordinator 250 may scale up the number of analyzer hosts as host metrics exceed a performance or usage threshold or scale down the number of analyzer hosts as host usage metrics drop below a performance or usage threshold. In one embodiment, the analyzer coordinator 250 may interact with a resource manager of a provider network in order to select, provision, configure, and/or deprovision hosts. For example, the resource manager may respond to a request from the analyzer coordinator 250 by reserving a particular set of hosts from a pool of available hosts. Similarly, the resource manager may deprovision and return surplus hosts to the pool of available hosts, e.g., for use by other services.

Figure 6:
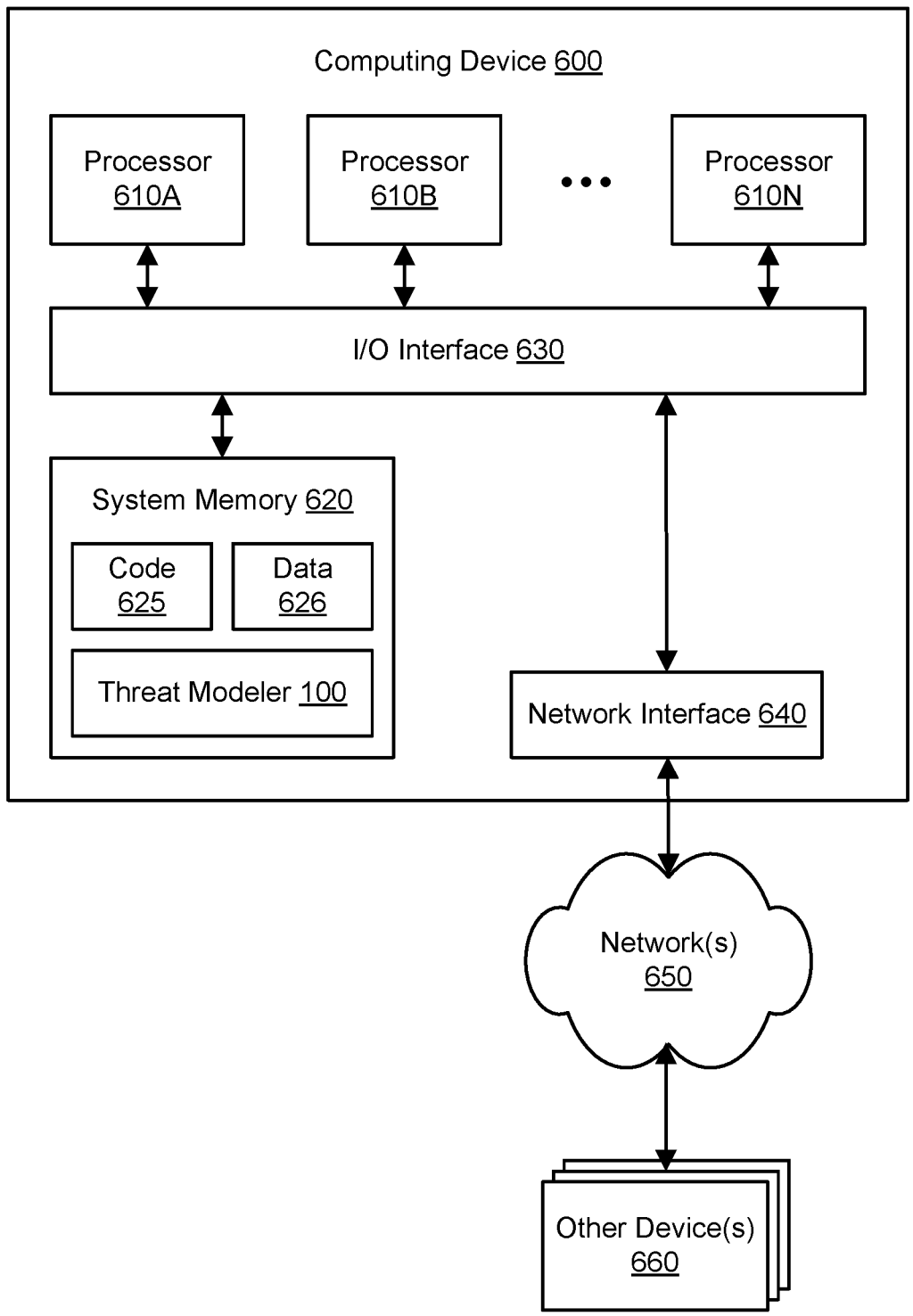
FIG. 6 illustrates an example computing device that may be used in some embodiments.

The threat modeler 100 and hosts 200 and 260A-260N may be implemented using any suitable number and configuration of computing devices, any of which may be implemented by the example computing device 600 illustrated in FIG. 6. The computing devices may be located in any suitable number of data centers or geographical locations. In various embodiments, at least some of the functionality of the threat modeler 100 may be provided by the same computing device or by different computing devices. If any of the components of the threat modeler 100 are implemented using different computing devices, then the components and their respective computing devices may be communicatively coupled, e.g., via one or more networks. Each of the components of the threat modeler 100 may represent any combination of software and hardware usable to perform their respective functions, as discussed as follows. Operations implemented by the threat modeler 100 may be performed automatically, e.g., without a need for user initiation or user intervention after an initial configuration stage, and programmatically, e.g., by execution of program instructions on at least one computing device. It is contemplated that the threat modeler 100 and hosts 200 and 260A-260N may include additional components not shown, fewer components than shown, or different combinations, configurations, or quantities of the components shown.

The threat modeler 100 and hosts 200 and 260A-260N may be implemented in a service-oriented system in which multiple services collaborate according to a service-oriented architecture. In such an environment, the threat modeler 100 may offer its functionality as service to multiple clients. A service may be implemented using a plurality of different instances that are distributed throughout one or more networks, and each instance may offer access to the functionality of the corresponding service to various clients. It is contemplated that any suitable number and configuration of clients may interact with the threat modeler 100. To enable clients to invoke its functionality, the threat modeler 100 may expose any suitable interface(s), such as one or more APIs or other programmatic interfaces and/or graphical user interfaces (GUIs). In one embodiment, the functionality of the threat modeler 100 may be offered to clients in exchange for fees.

Components of the enterprise 185, such as ETL tools that provide information about software products and their relationships, may convey network-based service requests to the threat modeler 100 via one or more networks. In various embodiments, the network(s) may encompass any suitable combination of networking hardware and protocols necessary to establish network-based communications between the enterprise 185 and the threat modeler 100. For example, the network(s) may generally encompass the various telecommunications networks and service providers that collectively implement the Internet. The network(s) may also include private networks such as local area networks (LANs) or wide area networks (WANs) as well as public or private wireless networks. For example, both the software products 180 (and associated ETL tools) and the threat modeler 100 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the enterprise 185 and the Internet as well as between the Internet and the threat modeler 100. It is noted that in some embodiments, the enterprise 185 may communicate with the threat modeler 100 using a private network rather than the public Internet.

In one embodiment, aspects of the threat modeler 100 and hosts 200 and 260A-260N may be implemented using computing resources of a provider network. A provider network may represent a network set up by an entity such as a company or a public sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network.

In some embodiments, an operator of the provider network may implement a flexible set of resource reservation, control, and access interfaces for their clients. For example, a resource manager may implement a programmatic resource reservation interface (e.g., via a web site or a set of web pages) that allows clients (potentially including other components within the provider network) to learn about, select, purchase access to, and/or reserve compute instances offered by the provider network. Such an interface may include capabilities to allow browsing of a resource catalog and provide details and specifications of the different types or sizes of resources supported, the different reservation types or modes supported, pricing models, and so on.

Figure 3A:
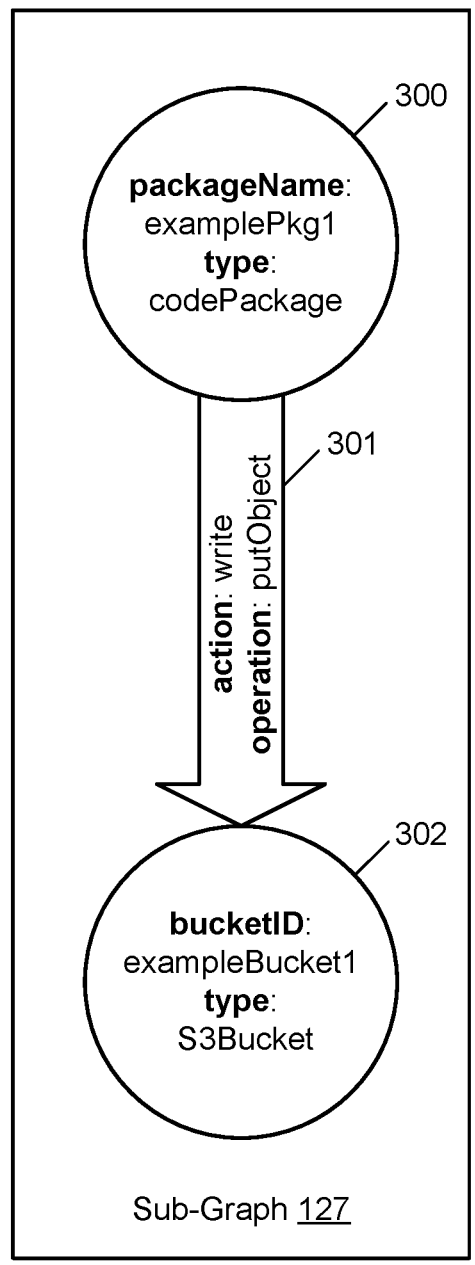
FIG. 3A and FIG. 3B illustrate example sub-graphs usable for automated threat modeling, according to some embodiments.
Figure 3B:
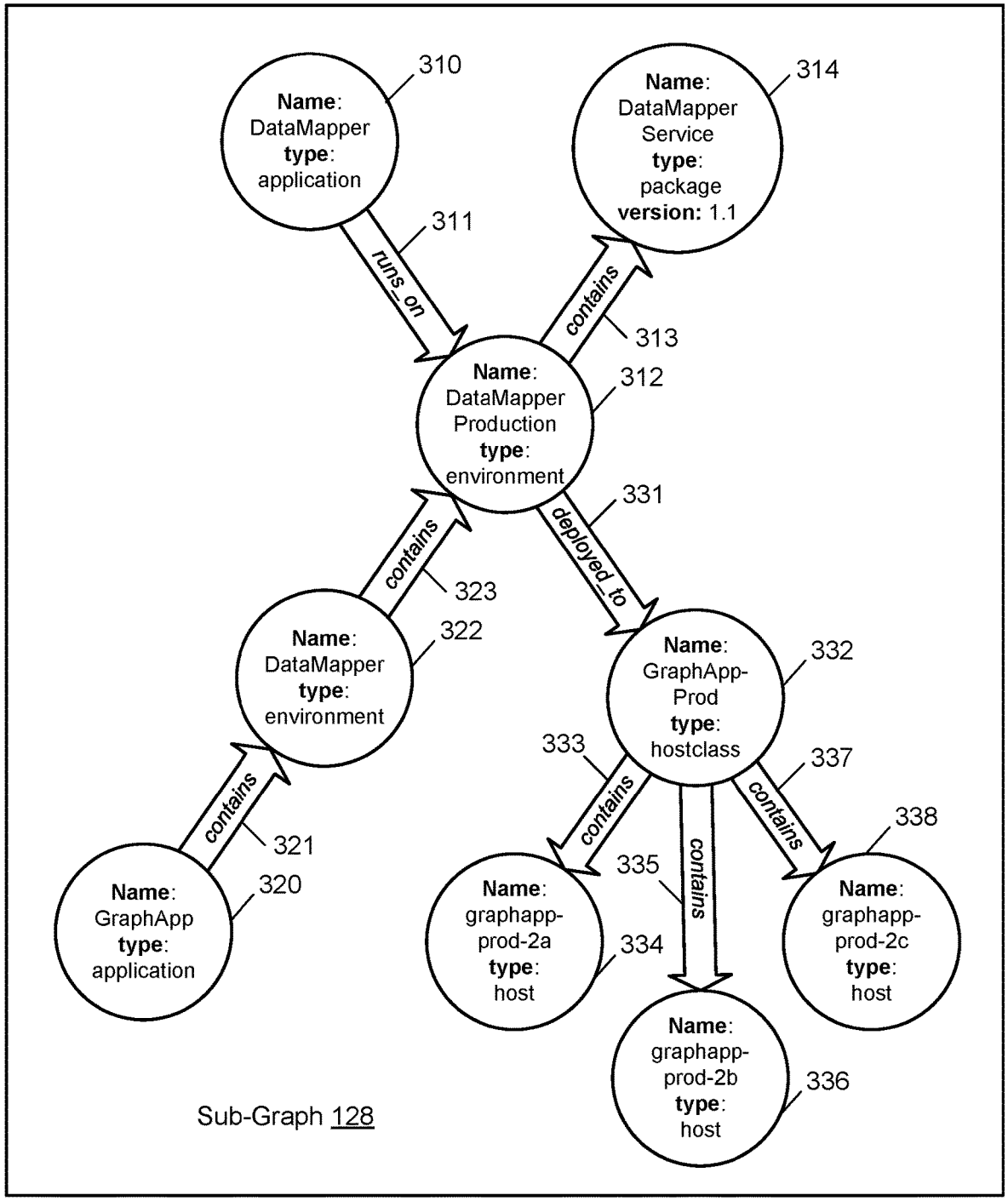

FIG. 3A and FIG. 3B illustrate example sub-graphs usable for automated threat modeling, according to some embodiments. FIG. 3A shows an example sub-graph 127 with two nodes 300 and 302 and one edge 301. Node 300 may represent a particular code package that makes putObject requests to write to a specific storage object (e.g., a bucket in a storage service). Node 300 may include metadata describing the package name ("examplePkg1") and the component type ("codePackage"). Node 302 may represent the destination storage object and include metadata describing the bucket identifier ("exampleBucket1") and the component type ("S3Bucket"). A directed edge 301 may represent the relationship between the two nodes and may include metadata describing the action ("write") and specific operation ("putObject"). In one embodiment, the terms in the graph metadata may be used consistently throughout the entire graph 125, e.g., such that the same types of components have consistent component type descriptions and the same types of actions have consistent descriptions.

The sub-graph 127 may be built or augmented using the graph builder 120 based (at least in part) on automated relationship analysis 110. In response to an event that involves examplePkg1 or exampleBucket1 or the write action between them, the sub-graph 127 may be updated and then subjected to automated threat modeling using sub-graph traversal. For example, if the access control policy for exampleBucket1 has been modified (as indicated by an event), then the sub-graph 127 may be reviewed using the rules engine(s) 160 to determine whether any security vulnerabilities have been introduced by the change.

FIG. 3B shows an example sub-graph 128 associated with a DataMapperService and related components. Each node (vertex) may include a component type as well as one or more uniquely identifying attributes such as a name, a version, and so on. Using the type combined with the uniquely identifying attribute(s), each node in the graph 125 may be uniquely and deterministically identifiable. By ensuring that each node is uniquely identifiable, the threat modeler 100 may accurately identify the relevant sub-graph for a given event. Each edge in the graph may be associated with two nodes, may have a direction, and may have a label that generally describes the relationship. In the example sub-graph 128, a node 310 may represent an application named DataMapper. An edge 311 may indicate that node 310 runs on a node 312 representing an execution environment named DataMapperProduction. An edge 313 may indicate that the node 312 contains a package named DataMapper- Service having a version number of 1.1. A node 320 may represent another application 320 named GraphApp. A node 322 may represent another environment named DataMapper. An edge 321 may indicate that node 320 contains node 322, and an edge 323 may indicate that node 322 contains node 312. Node 312 may be deployed to a hostclass named GraphApp-Prod as represented by node 332 and edge 331. The hostclass node 322 may contain three individual named hosts (graphapp-prod-2a, graphapp-prod-2b, and graphapp-prod-2c) as indicated by nodes 334, 336, and 338 and edges 333, 335, and 336.

The sub-graph 128 may be built or augmented using the graph builder 120 based (at least in part) on automated relationship analysis 110. In response to an event that involves any of the applications, environments, packages, hostclasses, or hosts shown in FIG. 3B, the sub-graph 128 may be updated and then subjected to automated threat modeling using sub-graph traversal. For example, if the access credentials for the graphapp-prod-2b host have been modified (as indicated by an event), then all or part of the sub-graph 128 may be reviewed using the rules engine(s) 160 to determine whether any security vulnerabilities have been introduced by the change. As another example, if a different version of the DataMapperService package (represented by node 312) is deployed to replace version 1.1, then all or part of the sub-graph may be reviewed using the rules engine(s) 160 to determine whether any security vulnerabilities have been introduced by the change.

Figure 4:
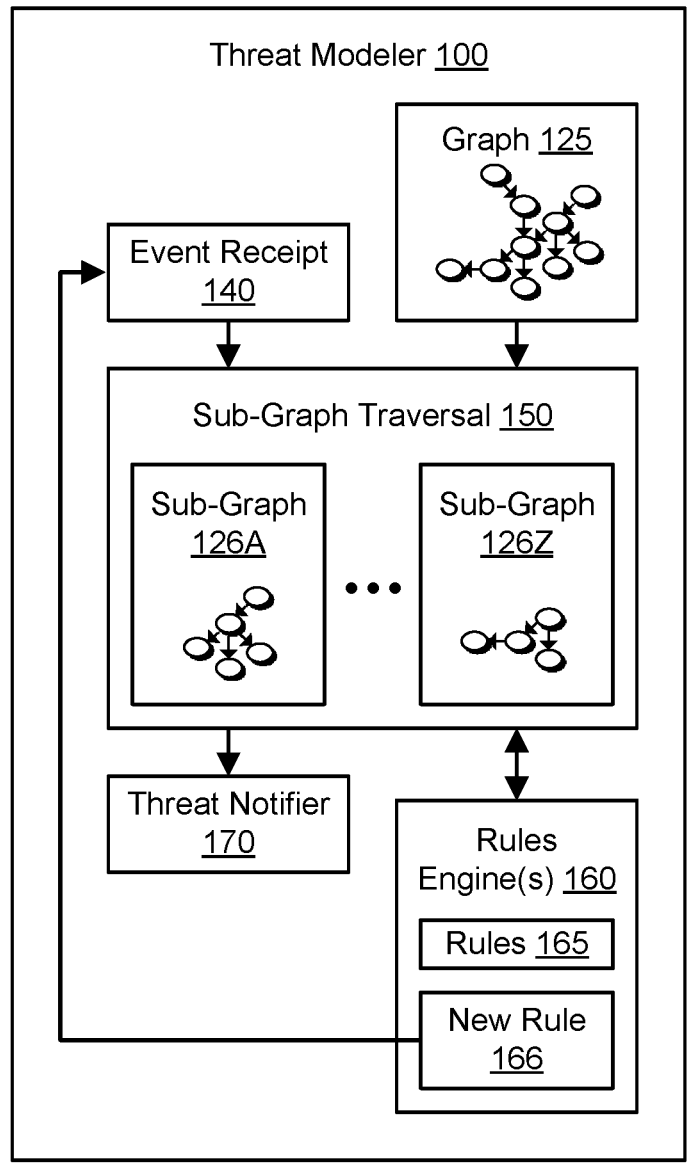
FIG. 4 illustrates further aspects of the example system environment for automated threat modeling using application relationships, including the addition of a new rule to a rules engine as a trigger for automated threat modeling of multiple sub-graphs, according to one embodiment.

FIG. 4 illustrates further aspects of the example system environment for automated threat modeling using application relationships, including the addition of a new rule to a rules engine as a trigger for automated threat modeling of multiple sub-graphs, according to one embodiment. In one embodiment, an event received by the event receipt component 140 may be indicative of a new rule 166 added to a rules engine used for threat modeling. The new rule 166 may represent a modification to a prior rule or may instead represent an entirely new rule, e.g., to detect a newly discovered security threat or vulnerability. In one embodiment, an event received by the event receipt component 140 may be indicative of a new policy added to an analyzer used for threat modeling. In one embodiment, the threat modeler 100 may seek to review the entire graph 126 (or large portions of the graph) with respect to the new rule or new policy. Accordingly, the threat modeler 100 may perform sub-graph traversal for threat analysis using the new rule 166 or new policy for a plurality of sub-graphs 126A-126Z. In order to use computing resources efficiently for a large enterprise with a large number of sub-graphs, the threat modeler may roll out the new rule or new policy to various sub-graphs 126A-126Z over hours, days, or even weeks. As discussed above, the threat modeler 100 may generate notifications to interested parties (including users and/or automated systems) using the threat notifier 170 if any software components are found to match the new rule 166 or to violate the new policy. Matching a rule may represent a violation of a policy for security best practice and may result in a finding that a software component represents a security threat or vulnerability.

Figure 5:
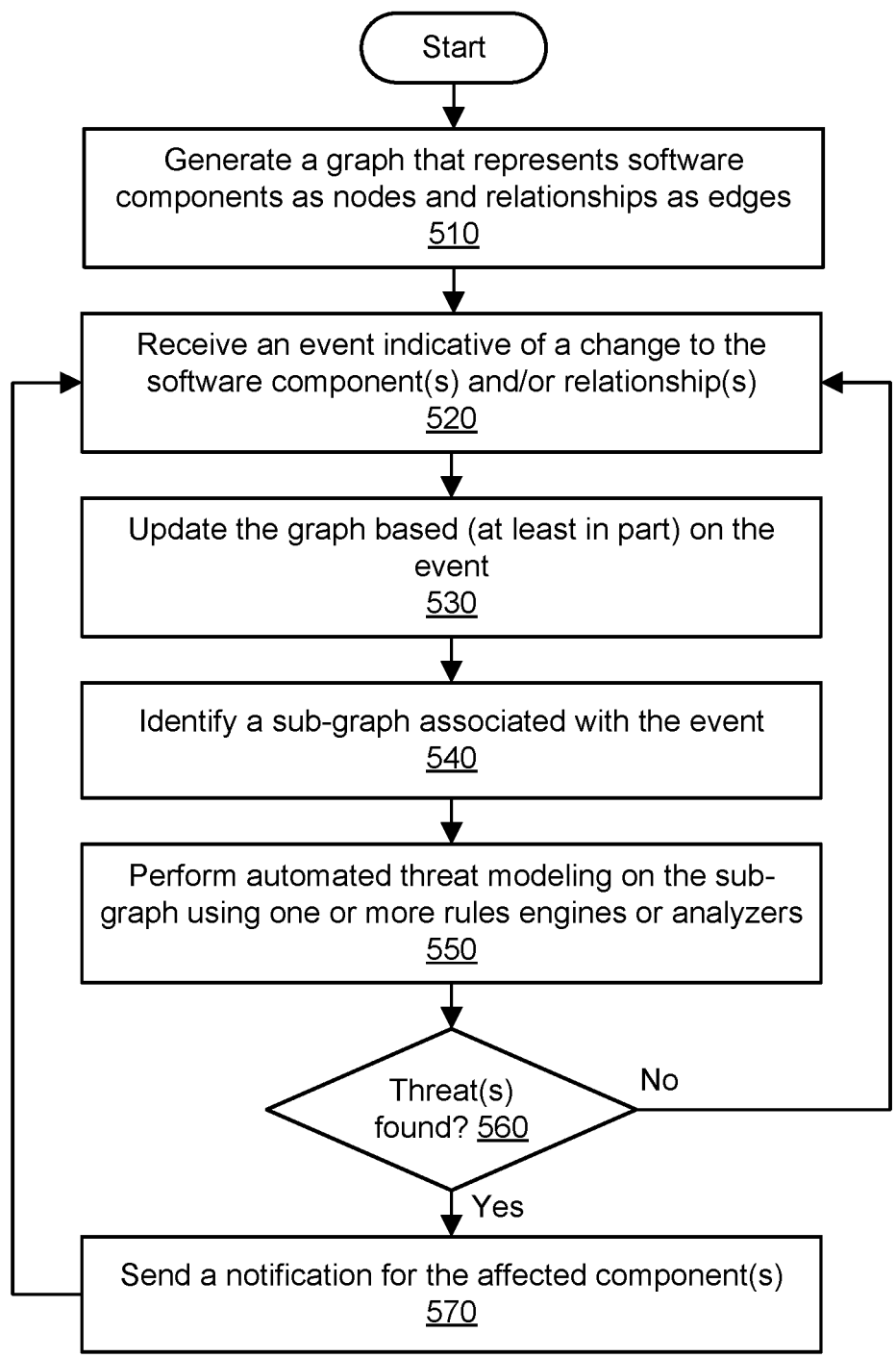
FIG. 5 is a flowchart illustrating a method for automated threat modeling using application relationships, according to one embodiment.

FIG. 5 is a flowchart illustrating a method for automated threat modeling using application relationships, according to one embodiment. As shown in 510, a graph may be generated. The graph may include a plurality of nodes representing software components and a plurality of edges representing relationships between software components. The edges may include directed edges. In one embodiment, the graph may be a directed acyclic graph. The relationships may include relationships between components of a single application and/or relationships from one application to another application. For example, two connected nodes may represent an application and a storage object in a storage service, and the edge between the nodes may represent that the application stores data in that storage object. The graph may capture a complex web of intra-application and inter-application relationships in an enterprise, such that different portions of the graph (sub-graphs) may represent different applications or services. For a sufficiently large enterprise, the enterprise-wide graph may include vast numbers of nodes.

In one embodiment, the graph may be built using automated techniques such as static code analysis and/or dynamic (runtime) analysis. Static code analysis may include analysis of program code of applications and their components, e.g., to determine intra-application and inter-application relationships reflected in the program code. Runtime analysis may include call tracing among instances of applications and their components, e.g., to determine intra-application and inter-application relationships reflected in real-world service calls. In one embodiment, the graph may be built initially based on user input (e.g., using one or more tools that permit users to describe application architectures) and then modified and/or corrected using the automated techniques to reduce human error. In one embodiment, the user tool(s) for describing application architectures and the tool for automated graph building may use a similar or identical set of terms for application types, relationship types, datatypes, and so on, in order to facilitate the use of the user-supplied information for automated graph building. In one embodiment, the graph may include metadata for individual nodes and edges, and the metadata may indicate unique node identifiers, unique edge identifiers, node types, edge types, and so on. Using such metadata, each node and/or edge may be uniquely identified in the graph. In one embodiment, additional metadata may be stored outside of the graph, e.g., in a storage service at a location or key associated with a node or edge in the graph itself.

As shown in 520, an event may be received, e.g., by a threat modeler. The event may be indicative of a change to one or more of the nodes or edges in the graph. For example, the event may describe a change to the program code of a software component. As another example, the event may describe a change to the configuration of a software component. As yet another example, the event may describe a change to a relationship between two software components. Events may be generated by software development environments. An event may include data such as one or more affected software components or relationships that correspond to nodes or edges in the graph. The affected nodes or edges may be identified by comparing the graph metadata (e.g., the unique identifiers of nodes and edges) to the information in the event. In one embodiment, the event may be indicative of a new rule added to a rules engine used for threat modeling. The threat modeler may subscribe to events for changed software products and new rules, e.g., via an event streaming service. Events may be received repeatedly and at different times after the graph is built. Events may be received throughout the lifecycle of a particular software product, e.g., when the software is designed, implemented, tested, deployed, updated with minor updates, updated with major updates, and so on. By triggering the automated threat analysis on such events, a particular software product may undergo a security review again and again as the product or its relationships change.

As shown in 530, the graph may be modified based (at least in part) on the event. In modifying the graph, the threat modeler may add one or more nodes, add one or more edges, remove one or more nodes, remove one or more edges, modify the metadata for one or more nodes, modify the metadata for one or more edges, and/or update the graph in any other suitable manner. For example, if the event indicates that the program code has been updated to store a particular datatype in a particular location in a storage service, the threat modeler may add a node for that storage service (with metadata indicating the particular location) and a directed edge connecting the software product to the storage service. As another example, the graph metadata for the updated portion of the graph may be modified to indicate the datatypes of source data and destination data for a new relationship. In one embodiment, the graph may be updated by using one or more ETL (Extract, Transform, Load) tools to extract relevant data from a service or subsystem associated with the affected node(s) and then using that extracted data to modify particular elements of the graph.

As discussed above, the graph may capture a complex web of intra-application and inter-application relationships in an enterprise, such that different portions of the graph (sub-graphs) may represent different applications or services. As shown in 540, a sub-graph associated with the event may be identified in the graph. In one embodiment, the sub-graph may include a plurality of nodes rooted at one or more nodes associated with a software product affected by the event. For example, if a component of an application is updated with new program code, then a sub-graph of other components that are dependent on the updated component may be identified. As another example, if an access policy on a storage object is changed, then the sub-graph may include nodes associated with that storage object.

As shown in 550, threat modeling may be performed on the sub-graph. In one embodiment, the threat modeling may be performed using one or more rules engines or analyzers. A rules engine may apply one or more rules to metadata associated with nodes and edges of the sub-graph to determine whether security threats or vulnerabilities are present in those nodes or edges. An analyzer may determine whether one or more policies are met or violated by the nodes and edges of the sub-graph. To perform this threat modeling, the sub-graph may be traversed from one or more root nodes in a process termed micro-traversal. The extent of the micro-traversal (e.g., the point at which the traversal ends) may be determined by the requirements of particular rules or policies. The entire graph for an enterprise may be large and complex, and the use of micro-traversal of a sub-graph may permit the threat modeling to be performed efficiently and in a focused manner. The rules or policies may be written by developers to detect particular security threats and/or compliance with best practices. In one embodiment, a main rules engine or analyzer may be used for common threats, and additional rules engines or analyzers may be added to detect new or uncommon threats. In applying a rule to a sub-graph, metadata about nodes and edges may be extracted from the graph and used to determine whether the rule matches any portion of the sub-graph. The metadata may describe properties such as authentication properties, authorization properties, access control properties, datatype properties, and so on. Micro-traversals to apply rules or policies to sub-graphs may automate data-gathering and decision-making operations such as determining what a component does, determining what kind of data the component has, determining where the data is sent or stored, determining what protections are on the handling of the data, determining who has access to the hosts where code or data is located, and so on.

As shown in 560, the method may determine whether a security threat or vulnerability is present in the software product or whether the software product complies with (or instead violates) applicable policies. A particular rule or policy may dictate whether a threat or vulnerability is present based (at least in part) on the elements of the rule or policy as applied to the metadata associated with nodes and edges of the sub-graph. For example, if a node in the sub-graph acquires sensitive data such as user payment information and then stores that information in an insecure manner (e.g., as plaintext in a storage service bucket), then an applicable rule or policy may determine that the node represents a security threat and/or violates a best practice.

As shown in 570, if a threat or instance of policy noncompliance is found, then an owner or manager associated with the affected node may be notified about the threat or noncompliance. Contact information for the owner or manager (e.g., an e-mail address or messaging address) may be extracted from the node itself or from metadata associated with the node and stored outside the graph, and a notification may be generated and sent to that contact address. In one embodiment, a notification may be provided to a subsystem that implements the affected node(s) or a management console associated with the affected node(s). In some embodiments, the content of a notification may vary based (at least in part) on the rule or policy that was violated. A notification may indicate data such as a name or identifier of the insecure node or relationship, a name or description of the rule or policy that was violated, a datatype that was handled insecurely, a description of the event that triggered the automated threat modeling, a timestamp of the event, a timestamp of the threat modeling, a classification of the risk level (e.g., high, medium, or low), and/or other suitable data usable by the owner or manager to mitigate the security threat.

Illustrative Computer System

In at least some embodiments, a computer system that implements a portion or all of one or more of the technologies described herein may include a computer system that includes or is configured to access one or more computer-readable media. FIG. 6 illustrates such a computing device 600. In the illustrated embodiment, computing device 600 includes one or more processors 610A-610N coupled to a system memory 620 via an input/output (I/O) interface 630. Computing device 600 further includes a network interface 640 coupled to I/O interface 630.

In various embodiments, computing device 600 may be a uniprocessor system including one processor or a multiprocessor system including several processors 610A-610N (e.g., two, four, eight, or another suitable number). Processors 610A-610N may include any suitable processors capable of executing instructions. For example, in various embodiments, processors 610A-610N may be processors implementing any of a variety of instruction set architectures (ISAs), such as the x86, PowerPC, SPARC, or MIPS ISAs, or any other suitable ISA. In multiprocessor systems, each of processors 610A-610N may commonly, but not necessarily, implement the same ISA.

System memory 620 may be configured to store program instructions and data accessible by processor(s) 610A-610N. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 620 as code (i.e., program instructions) 625 and data 626. In the illustrated embodiment, system memory 620 also stores program code and data that implement aspects of the threat modeler 100 discussed above.

In one embodiment, I/O interface 630 may be configured to coordinate I/O traffic between processors 610A-610N, system memory 620, and any peripheral devices in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processors 610A-610N). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processors 610A-610N.

Network interface 640 may be configured to allow data to be exchanged between computing device 600 and other devices 660 attached to a network or networks 650. In various embodiments, network interface 640 may support communication via any suitable wired or wireless general data networks, such as types of Ethernet network, for example. Additionally, network interface 640 may support communication via telecommunications/telephony networks such as analog voice networks or digital fiber communications networks, via storage area networks such as Fibre Channel SANs, or via any other suitable type of network and/or protocol.

In some embodiments, system memory 620 may be one embodiment of a computer-readable (i.e., computer-accessible) medium configured to store program instructions and data as described above for implementing embodiments of the corresponding methods and apparatus. For example, system memory 620 may store program code and data associated with the threat modeler 100. In some embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 600 via I/O interface 630. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 600 as system memory 620 or another type of memory. Further, a computer-readable medium may include transmission media or signals such as electrical, electromagnetic, or digital signals, conveyed via a communication medium such as a network and/or a wireless link, such as may be implemented via network interface 640. Portions or all of multiple computing devices such as that illustrated in FIG. 6 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more computing devices configured to implement a threat modeler, wherein the threat modeler is configured to:

generate a graph of intra-application and inter-application relationships among a plurality of distinct applications, the graph comprising a plurality of nodes and a plurality of edges, wherein at least a portion of the nodes represent application components for respective applications of the plurality of distinct applications and at least a portion of the edges represent relationships between applications or between application components;

receive an event indicative of a change to one or more of the application components represented by the nodes, or to the relationships between the applications or between the application components represented by the edges in the graph;

modify the graph based at least in part on the change;

identify, in the modified graph, a sub-graph associated with the change;

perform threat modeling, restricted to the sub-graph associated with the change, using a rules engine, wherein the rules engine applies one or more rules to metadata associated with a plurality of nodes and one or more edges of the sub-graph, and wherein the threat modeling restricted to the sub-graph determines that one or more security threats are present in the sub-graph based at least in part on application of the one or more rules; and transmit, over a network, a notification associated with the one or more security threats determined by the threat modeling restricted to the sub-graph, wherein the notification is transmitted based at least in part on the change made to one or more of the application components represented by the nodes, or to the relationships between the applications or between the application components represented by the edges in the graph.

2. The system as recited in claim 1, wherein the change comprises a modification to program code associated with one of the application components or a modification to a configuration of one of the application components.

3. The system as recited in claim 1, wherein to generate the graph, the threat modeler is configured to the generate the graph based on a prior version of the graph, the prior version of the graph generated based at least in part on user input, and wherein, in the generation of the graph, the threat modeler is configured to modify the prior version of the graph based at least in part on automated analysis of the application components.

4. The system as recited in claim 1, wherein to perform the generation of the graph, the threat modeler is configured to generate the graph based at least in part on static analysis or runtime analysis of the application components.

5. A computer-implemented method performed by one or more computing devices, comprising:

determining a graph of intra-application and inter-application relationships among a plurality of distinct applications, the graph comprising a plurality of nodes and a plurality of edges, wherein at least a portion of the nodes represent software components for respective applications of the plurality of distinct applications and at least a portion of the edges represent relationships between applications or between software components;

determining, in the graph, a sub-graph associated with a change, indicated by an event, that has been made to one or more of:

the software components represented by the nodes, or the relationships between the applications or between the software components represented by the edges in the graph;

performing, responsive to the event indicative of the change to one or more of the software components or the relationships between the applications or between the software components represented by the edges, threat modeling restricted to the sub-graph associated with the change, using one or more analyzers, comprising determining whether the sub-graph associated with the change complies with one or more policies; and transmitting, over a network, a notification associated with the determining compliance with the one or more policies, wherein the notification is transmitted based at least in part on the change made to one or more of the software components represented by the nodes, or the relationships between the applications or between the software components represented by the edges in the graph.

6. The method as recited in claim 5, wherein the threat modeling determines, based at least in part on the application of one or more rules, that one or more of the nodes in the sub-graph fail to comply with the one or more policies.

7. The method as recited in claim 6, wherein said transmitting the notification comprises:

sending the notification to one or more owners of one or more software components represented by the one or more of the nodes that fail to comply with the one or more policies.

8. The method as recited in claim 5, further comprising: modifying the graph based at least in part on the change.

9. The method as recited in claim 5, wherein the change comprises a modification to program code associated with one of the software components or a modification to a configuration of one of the software components.

10. The method as recited in claim 5, wherein an initial version of the graph is determined based at least in part on user input, and wherein determining the graph comprises modifying the initial version of the graph based at least in part on automated analysis of the software components.

11. The method as recited in claim 5, wherein the graph is determined based at least in part on static analysis of program code or configurations associated with the software components.

12. The method as recited in claim 5, wherein the graph is determined based at least in part on runtime analysis of the software components.

13. The method as recited in claim 5, further comprising:

determining, in the graph, an additional sub-graph associated with an additional event indicative of an additional change; and performing additional threat modeling on the additional sub-graph using the one or more analyzers, comprising determining whether the additional sub-graph complies with the one or more policies.

14. The method as recited in claim 5, further comprising:

adding a new policy to the one or more analyzers;

determining, in the graph, a plurality of additional sub-graphs associated with a plurality of software products; and performing additional threat modeling on the additional sub-graphs using the one or more analyzers, comprising determining whether the sub-graph complies with the new policy.

15. One or more non-transitory computer-readable storage media storing program instructions computer-executable on or across one or more processors to perform:

determining a graph of intra-application and inter-application relationships among a plurality of distinct applications, the graph comprising a plurality of nodes and a plurality of edges, wherein at least a portion of the nodes represent software products for respective applications of the plurality of distinct applications and at least a portion of the edges represent relationships between the applications or between the software products;

receiving an event indicative of a change to one or more of the software products represented by the nodes, or to the relationships between the applications or between the software products represented by the edges in the graph;

determining, in the graph, a sub-graph associated with the change;

performing threat modeling, restricted to the sub-graph associated with the change, using a rules engine, wherein performing threat modeling comprises applying one or more rules to the sub-graph, and wherein application of the one or more rules determines whether one or more security vulnerabilities are present in the sub-graph; and transmitting, over a network, a notification associated with the threat modeling restricted to the sub-graph, wherein the notification is transmitted based at least in part on the change made to one or more of the software products represented by the nodes, or the relationships between the applications or between the software products represented by the edges in the graph.

16. The non-transitory computer-readable storage media as recited in claim 15, wherein the change comprises a modification to a relationship between two of the software products.

17. The non-transitory computer-readable storage media as recited in claim 15, wherein an initial version of the graph is determined based at least in part on user input, and wherein determining the graph comprises correcting the initial version of the graph based at least in part on automated analysis of the software products.

18. The non-transitory computer-readable storage media as recited in claim 15, wherein the graph is determined based at least in part on metadata received from one or more sources in an enterprise.

19. The non-transitory computer-readable storage media as recited in claim 18, wherein the one or more sources comprise one or more extract, transform, and load (ETL) tools.

20. The non-transitory computer-readable storage media as recited in claim 15, wherein the program instructions are further computer-executable to perform:

determining, in the graph, a plurality of additional sub-graphs associated with a plurality of additional events indicative of additional changes; and performing additional threat modeling on the additional sub-graphs using the rules engine, comprising applying the one or more rules to the additional sub-graphs, wherein application of the one or more rules determines whether the one or more security vulnerabilities are present in the additional sub-graphs.

* * * * *